United States Patent [19]

Van der Ven

[11] Patent Number: 4,812,704

[45] Date of Patent: Mar. 14, 1989

[54] COLOR TELEVISION DISPLAY TUBE

[75] Inventor: Robert F. L. M. Van der Ven, Eindhoven, Netherlands

[73] Assignee: U.S. Philips Corp., New York, N.Y.

[21] Appl. No.: 678,374

[22] Filed: Dec. 5, 1984

Related U.S. Application Data

[63] Continuation of Ser. No. 533,628, Sep. 19, 1983, abandoned, which is a continuation of Ser. No. 270,445, Jun. 4, 1981, abandoned.

[30] Foreign Application Priority Data

Jun. 23, 1980 [NL] Netherlands ........................ 8003609

[51] Int. Cl.[4] ............................................ H01S 29/06

[52] U.S. Cl. .................................... 313/402; 313/404; 313/406

[58] Field of Search ............... 313/402, 403, 404, 405, 313/406, 407, 408

[56] References Cited

U.S. PATENT DOCUMENTS 3,999,098 12/1976 Dougherty .......................... 313/407
4,050,602 9/1977 Tom et al. ....................... 313/406 X
4,358,702 11/1982 Gijrath et al. .................. 313/406 X

*Primary Examiner*—David K. Moore
*Assistant Examiner*—Sandra L. O'Shea
*Attorney, Agent, or Firm*—Robert J. Kraus

[57] ABSTRACT

A color selection electrode (29) for a color television display tube is suspended in the corners of the display window (20) with the aid of suspension means which comprise a flat resilient element (27). The resilient element (27) comprises an embossment (28). The embossment (28) falls partly through a recess (36) in a brace (34) which is connected to the color selection electrode (29). This assembly of the embossment (28) and the recess (36) forms a so-called ball joint. As a result of the hinging action of the ball-joint the color selection electrode (29) is suspended without moments being exerted on the color selection electrode (29). FIG. 2a.

11 Claims, 4 Drawing Sheets

COLOR TELEVISION DISPLAY TUBE

This is a continuation of application Ser. No. 533,628, filed Sept. 19, 1983, now abandoned, which is a continuation of application Ser. No. 270,445 filed June 4, 1981 now abandoned.

BACKGROUND OF THE INVENTION

The invention relates to a colour television display tube comprising an envelope having a substantially rectangular display window and a substantially rectangular colour selection electrode which comprises a large number of apertures and is suspended in the corners of the display window with the aid of suspension means comprising flat resilient elements.

Such a colour television display tube is disclosed in U.S. Pat. No. 3,548,235. In this patent a construction is described for the suspension of a colour selection electrode, in particular a shadow mask, in which a rigid supporting frame connected to the shadow mask is not used. The shadow mask is formed by a substantially rectangular, comparatively flexible mask sheet manufactured from a thin metal sheet and provided with a large number of apertures. A mask ring of substantially the same thickness as the mask sheet is connected to the edge. The mask ring gives the shadow mask a certain rigidity in the direction of the rectangular sides. However, the shadow mask can be comparatively easily twisted about the diagonals and consequently has four hinge points at the corners. The shadow mask is suspended in the four corners of the display window with the aid of suspension means of which the part connected to the display window is formed by clamping springs which are clamped in chamber-like recesses in the corners of the display window. Flat resilient elements in the form of strip-shaped springs are connected to the clamping springs and permit expansion of the shadow mask when the temperature increases. The strip-shaped springs are connected to the shadow mask at the end remote from the clamping springs.

In such a suspension of the shadow mask, the desired distance between the shadow mask and the display window is established by four suspensions points in the corners of the shadow mask because with only three the shadow mask could be twisted about a diagonal. The position of the shadow mask relative to the display window in directions parallel to the display window is determined by three of the four suspension points. The position of the fourth suspension point is thus fixed by the other three points. The fourth suspension point should consequently assume an equilibrium position relative to the other three points. The position of the fourth suspension point is also determined by the position of the clamping spring in the chamber-like recess. As a result of this in the known tube moments are exerted on the shadow mask by the suspension means causing the shadow mask to be deformed. Moreover, in such a tube the forces which occur in the case of shocks or vibrations of the display tube cause movements of the shadow mask, which causes fading of the displayed picture.

U.S. Pat. No. 3,999,098 discloses a suspension of a shadow mask in the corners of the display window in which the parts of the suspension means connected to the shadow mask comprise very rigid leaf springs extending substantially parallel to the tube axis. Three of the four leaf springs include an aperture. The fourth leaf spring include a tapering mandril. The part of the suspension means connected to the display window is formed by four metal supports sealed in the corners of the display window and extending substantially perpendicularly to the diagonals of the display window. Three of the four supports include a tapering mandril. The fourth supporting member includes a substantially rectangular slot. The leaf springs having the apertures fall over the mandrils of the supports and the mandril of the fourth leaf spring falls into the rectangular slot of the fourth support. The fourth suspension point together with the three other suspension points determines the desired distance between the shadow mask and the display window. The position of the mask sheet in the plane thereof is determined by the three identical suspension points in the corners of the shadow mask. The mandril of the leaf spring of the fourth suspension point, in the rectangular slot of the fourth supporting member, seeks an equilibrium position for the mask sheet.

In such a suspension system the natural rigidity of the shadow mask is relied on to counteract the forces extended thereon by the leaf springs. Moreover, the position of the shadow mask is not unambiguously determined since the position of the fourth suspension point is not unambiguously determined. Thus, poor assembly reproducibility is obtained when the shadow mask is repeatedly assembled and disassembled in the tube. This repeated assembly and disassembly of the shadow mask is necessary when photographically producing the display screen. Assembly reproducibility is to be understood to mean the extent to which the shadow mask resumes the same position after each disassembly and assembly.

SUMMARY OF THE INVENTION

It is an object of the invention to provide a suspension means for a colour selection electrode in a television display tube which relies on the natural rigidity of the colour selection electrode to a lesser extent than prior constructions and which does not apply moments to the colour selection electrode.

Another object of the invention is to provide a suspension means for a colour electrode in a colour selection television display tube in which shocks or impacts cause substantially no microphony or fading of the displayed picture.

Yet another object of the invention is to provide a suspension means for a colour selection electrode in a colour television display tube in which the colour electrode, after repeated assembly and disassembly, always accurately resumes the same position or, in other words has good assembly reproducibility.

Still another object of the invention is to provide a suspension means for a colour selection electrode in a colour television display tube in which means is not necessary to compensate for the differences in expansion between the colour selection electrode and the display window during warmup to the operating temperature of the display tube, and which display tube is also independent of variations in the ambient temperature.

According to the invention, a colour television display tube of a kind mentioned in each opening paragraph is characterized in that the connection of the resilient element to another element of the suspension means is a punctiform or multipoint connection which is established by means of an opening in one of the parts connected together and an embossment in the other part. The embossment is connected to edges in the one part which define the opening.

The invention is based on the following principles. A colour selection electrode is constructed from a comparatively flexible mask sheet having a mask frame or a mask ring only along the sides. The sides of the mask frame or mask ring are rigid in the direction perpendicular to the plane of the mask sheet. However, the colour selection electrode can easily be twisted about the diagonals and consequently has four hinge points at the corners of the mask frame or mask ring. The position of the colour selection electrodce relative to the display window is fixed unambiguously if eight degrees of freedom of the colour selection electrode are fixed. Four of these degrees of freedom are necessary to unambiguously fix the distance from the corner points of the colour selection electrode to the display window. As a result of this the distance from the colour selection electrode to the display window is fixed unambiguously. The remaining four degrees of freedom which are fixed must prevent a movement of the corner points of the colour selection electrode in a direction perpendicular to the diagonals in the plane of the colour selection electrode. All other directions of movement are permitted. Since the corner points of the colour selection electrode cannot move in a direction perpendicular to the diagonals in the plane of the mask sheet, the position of the colour selection electrode relative to the display window is fixed unambiguously.

The above principles are put into practice as follows in a colour television display tube in accordance with the invention. The resilient elements of the suspension means are rigid in the respective planes of the elements themselves. As a result of this and because the position of the part of the suspension means connected to the display window is fixed unambiguously relative to the display window, the distance from the four corner points of the colour selection electrode to the display window is fixed unambiguously so that four degrees of freedom of the colour selection electrode are fixed. The embossment which extends into the opening and is connected to the edges thereof ensures that the corner points of the colour selection electrode cannot move in a direction perpendicular to the diagonals in the plane of the mask sheet, while the other directions of movement are permitted. The combination of the embossment and the opening actually forms a so-called ball joint the hinge action of which remains without plastic deformation because of the small dimensions of the embossment and the opening, in spite of the connection of the embossment to the edge of the opening. The remaining degrees of freedom which the corner points of the colour selection electrode have, ensure that the colour selection electrode assumes a position relative to the display window in which the suspension means exert no moments on the colour selection electrode. Since the position of the colour selection electrode is fixed rotationally symmetrical relative to the centre of the colour selection electrode, no rotation of the colour selection electrode occurs in the case of radial thermal expansion of the colour selection electrode.

When the display tube warms up the colour selection electrode expands and in order to maintain good colour purity a decreased distance from the colour selection electrode to the display window is necessary. Since the suspension means extend substantially perpendicularly to the direction of the electron beams when they are directed to the respective corners of the display window, the colour selection electrode moves toward the display window as a result of the resilient action of the suspension means when the display tube is warming up.

In a colour television display tube in accordance with the invention the suspension means may comprise a brace connected to the colour selection electrode and a resilient element connected to the window, with the brace having the embossment and the resilient element having the opening. However, a colour display tube in accordance with the invention is preferably characterized in that the brace has the recess and the resilient element has the embossment. In this case more space is available for connecting the brace to the resilient element. The embossment is preferably connected to the edges of the opening by a number of laser welds or other welds formed without contacting the suspension means.

An embodiment of a colour television display tube in accordance with the invention is characterized in that the opening is a triangular aperture and the embossment is part-spherical and is secured to the edge of the aperture. The triangular aperture ensures that the part-spherical embossment always falls reproducibly in the aperture and engages the edges of the aperture with three points.

A further embodiment is characterized in that the edges of the aperture are formed by puncturing the apertured element on the side remote from the spherical embossment. As a result of this the material is reinforced at the area of the aperture so that the embossment always slides equally far into the aperture.

Another embodiment is characterized in that the opening is a cavity having a bottom to which the embossment is secured.

Another embodiment is characterized in that the punctiform connection is situated substantially in one plane with the part of the colour selection electrode having a large number of apertures. As a result of this, the forces which are transmitted to the mask when shocks and vibrations occur are situated in the plane of the mask which is rigid in its own plane and thus cause no deformations of the mask sheet.

An embodiment in which one element of the suspension means is a brace connected to the colour selection electrode is characterized in that the brace comprises a part extending substantially parallel to the plane of the resilient element and widening from the place of the punctiform connection to both sides, and two bent-over parts which taper towards their free ends. The brace is narrower in the centre so as to obtain a low rigidity at the area of the aperture when the hinge points of the mask are formed. The tapering ends also serve to cause the rigidity to decrease slowly towards the free ends. At its most rigid point the brace may not be more rigid than the edge of the shadow mask so as not to bend the mask edge in the case of shock loads.

Another embodiment is characterized in that the end of the flat resilient element remote from the punctiform connection is secured to a strip connected in the corner of the upright edge of the display window. The place of the connection of the strip determines the distance from the corner points of the shadow mask and thus the distance from the shadow mask to the display window.

Another embodiment is characterized in that the strip is fixed in a chamber-like recess provided in the corner of the upright edge of the display window with the aid of a connection means such as a glass enamel or a cement. The position of the strip can be fixed very accurately by means of a jig.

Anoter embodiment is characterized in that the strip is sealed in the corner of the upright edge of the display window. The tolerances in the position of the strip occurring as a result of the sealing may cause a small rotation of the flat resilient element which, however, hardly influences the correct thermal action of the resilient element.

Another embodiment is characterized in that the strip comprises a substantially U-shaped bent-over part and the flat resilient element comprises a bent-over part at its end facing the strip, which is connected in the U-shaped bent-over part of the strip. In this manner the strip may be cemented in the chamber-like recess in a comparatively inaccurate manner or be sealed in the upright edge, after which the resilient element is secured accurately in the U-shaped bent-over part by, for example, soldering. In this manner possible errors in all directions are compensated for.

BRIEF DESCRIPTION OF THE DRAWING

The invention will now be described in greater detail, by way of example, with reference to the accompanying drawing, of which.

DESCRIPTION OF THE PREFERRED EMBODIMENTS

Figure 1:
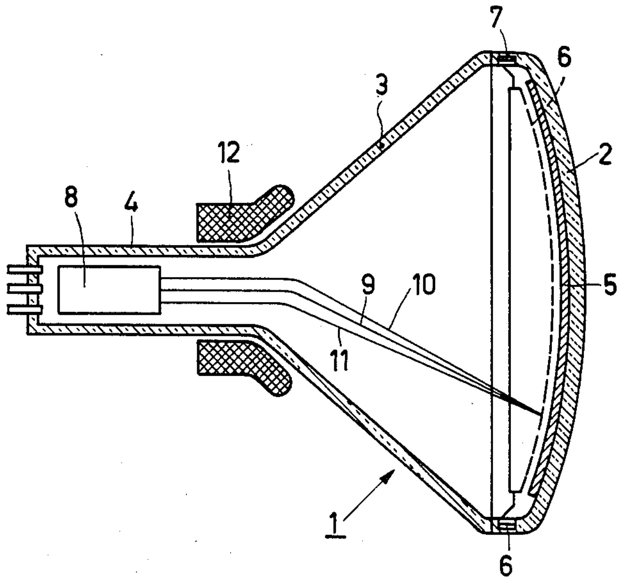
FIG. 1 is a sectional view of a colour television display tube according to the invention.

The colour television display tube according to the invention shown in FIG. 1 comprises a glass envelope 1 including a substantially rectangular window 2 having an upright edge, a cone 3 and a neck 4. A pattern 5 of phosphors luminescing in the colours red, green and blue is provided on the display window 2. At a short distance from the display window 2 a shadow mask 6 is connected with the aid of suspension means 7. An electron gun 8 for producing three electron beams 9, 10 and 11 is mounted in the neck 4 of the tube. These beams are deflected by means of a system of deflection coils 12 placed around the tube and intersect each other substantially at the shadow mask 6, after which each of the electron beams impinges on one of the three phosphors provided on the display window.

Figure 2A:
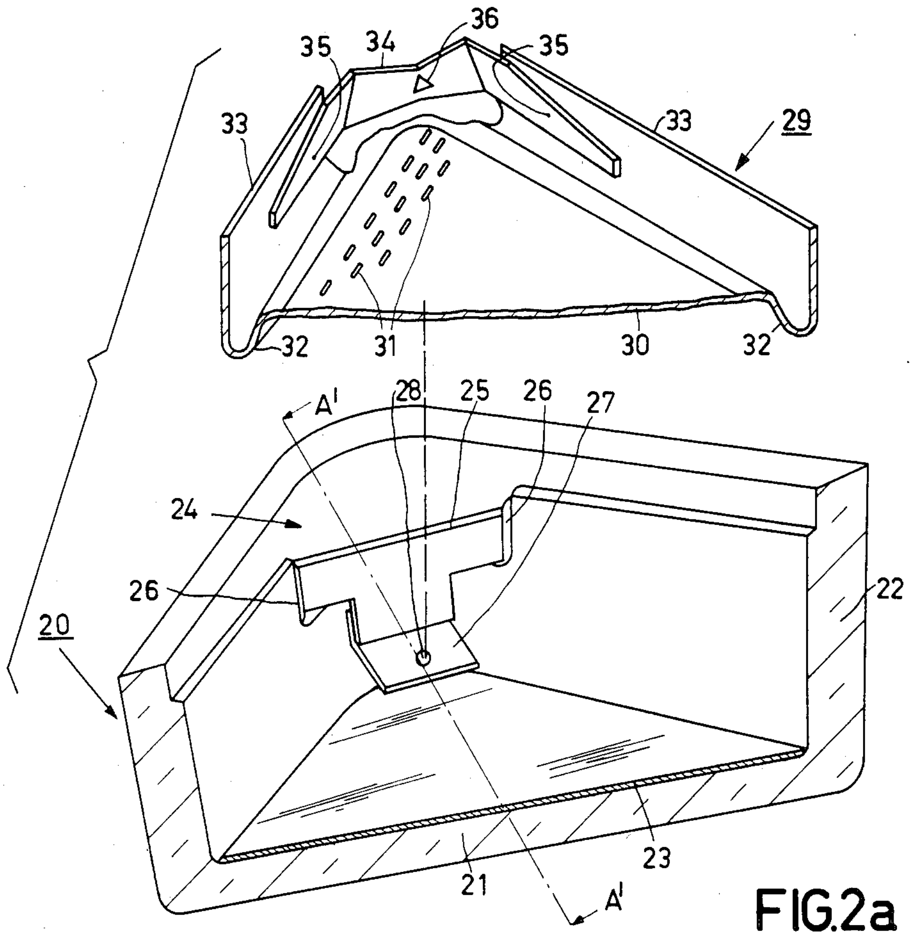
FIG. 2*a* is an exploded perspective view of an embodiment of a corner of the display window.
Figure 2B:
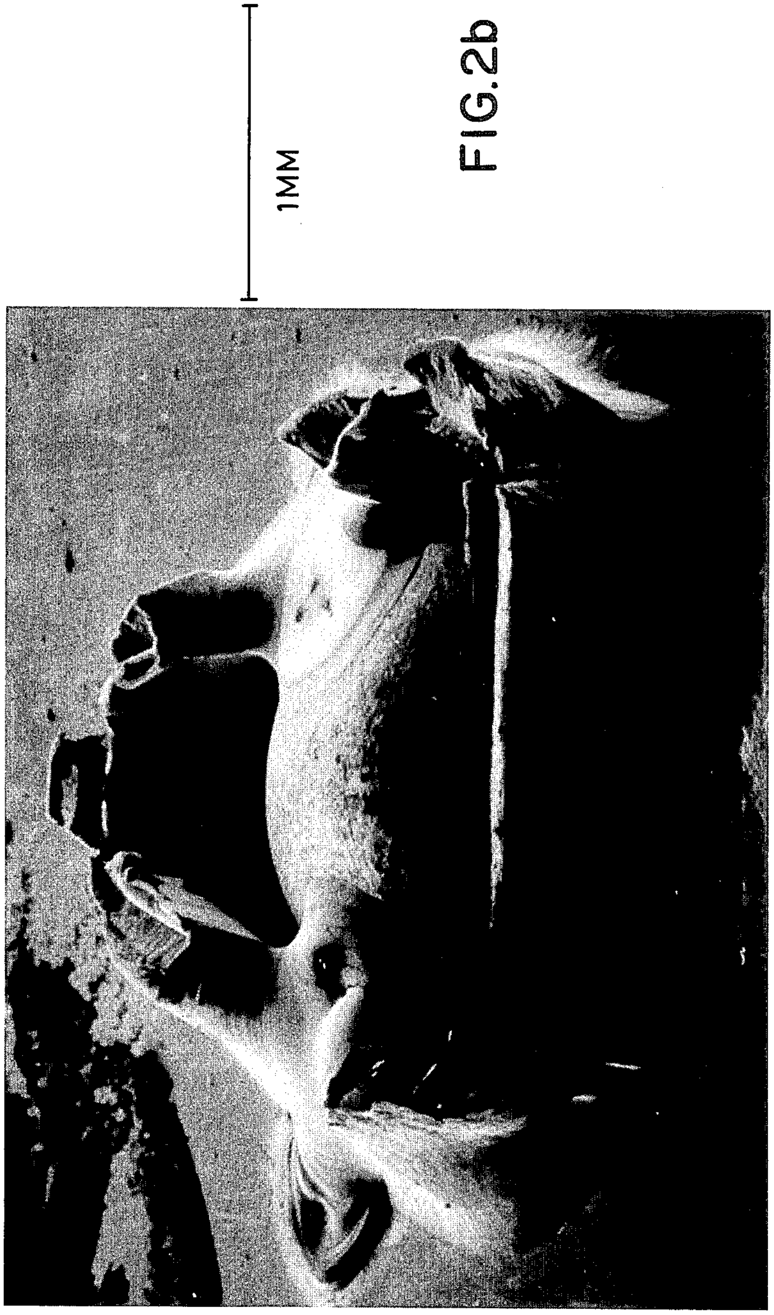
FIG. 2*b* shows in detail the connection of the spherical embossment at the edge of the aperture.

The manner in which the shadow mask 6 is connected in the corners of the display window 2 with the aid of the suspension means 7 will be explained with reference to FIGS. 2*a* and 2*b*. FIG. 2*a* is an exploded perspective view of a corner of the display window. The display window 20 has a front portion 21 with an upright edge 22. The phosphor pattern luminescing in three colours on the front portion 21 is covered with an aluminium coating 23. A metal strip 25 is fixed in a chamber-like recess 24 by means of a glass enamel 26. A flat resilient element 27 having a spherical embossment 28 at its free end is connected to the strip 25. The shadow mask 29 comprises a mask sheet 30 having apertures 31. Each side of the sheet is formed into a groove 32 and a collar 33. It is to be noted that the construction of this shadow mask forms the subject matter of a simultaneously filed U.S. Patent Application Ser. No. 270,446 (PHN 9774). A brace 34 having two bent tapering ends 35 is connected to two of the collars 33. The brace 34 has an opening in the form of a triangular aperture 36.

The shadow mask 29 is connected to the display window 20 as follows. The shadow mask 29 is placed at the correct distance from the front portion 21 of the display window by means of a jig which holds the four corner points of the shadow mask 29 at the desired distance from the front portion 21. The part-spherical embossment 28 is held in the triangular aperture 36 by a temporary clamping spring. The strip 25 in the chamber-like recess is then fixed by means of a glass enamel 26 and is held in this position by means of a jig until the glass enamel 26 has cured after an oven process. The temporary clamping spring is then removed. In order to provide the phosphor pattern 23 for luminescing in three colours, the shadow mask 29 must be repeatedly assembled and disassembled and should always resume the same position. This unambiguous positioning is ensured because the part-spherical embossment 28 always engages the edges of the triangular aperture 36 at three points and because the edge of the aperture 36 is bent over at the three sides of the triangle for reinforcement and for ensuring that the spherical embossment 28 always falls through the aperture 36 to the same extent. After providing the phosphor pattern, the spherical embossment 28 is permanently secured to the edge of the aperture 36 by means of a number of laser welds or other welds formed without contacting the suspension means. Contactless welding has the advantage that no mechanical stresses are exerted on the mask so that no movements of the mask occur. Such welding also prevents welding sputters from landing on the shadow mask or the screen. FIG. 2*b* shows in detail the connection of the part-spherical embossment 28 to the edge of the aperture 36.

As a result of the above-described suspension of the shadow mask 29 the position of the shadow mask 29 relative to the display window 20 is fixed unambiguously without moments being transmitted to the shadow mask 29.

The shadow mask 29 may be considered as a comparatively flexible mask sheet having bent-over sides which constitute rigid beams. As a result of this the shadow mask has four hinge points at the corners. The distance from the shadow mask 29 to the front portion 21 is fixed unambiguously if the distance from the corner points to the front portion 21 is fixed unambiguously. This distance is fixed because the distance from the strips 25 to the front portion 21 is fixed unambiguously. The position of the shadow mask 29 relative to the upright edge 22 of the display window 20 is fixed unambiguously if the corner points of the shadow mask 29 cannot move in a direction perpendicular to the diagonals of the shadow mask 29 in the plane of the mask sheet. As a result of the connection of the part-spherical embossment 28 and the brace 34 and since the resilient elements 27 are rigid in their own plane, the corner points of the shadow mask 29 cannot move perpendicularly to the diagonals, while the other directions of movement are permitted. This is possible because the part-spherical embossment 28 in the aperture 36 of the brace 34 forms a so-called ball joint. The hinging action of this ball joint remains without plastic deformation occurring because of the elasticity of the punctiform welds. The brace 34 is spaced at a small distance from the resilient element 27 because the spherical embossment 28 falls only partly through the triangular aperture 36. Consequently the shadow mask 29 can perform a small rotation about an axis through the ball joint in the plane of the resilient element 27 perpendicular to a diagonal of the shadow mask 29 and about an axis through the ball joint perpendicular to the plane of the shadow mask 29. The shadow mask 29 can also perform a small rotation, within the elasticity range of the ball joint, about an axis perpendicular to the two abovementioned axes.

In the shadow mask 29 shown the triangular aperture 36 lies in the plane of the mask sheet 30. As a result of this the forces occurring in the case of vibrations and shocks are situated in the plane of the mask sheet 30, which is rigid in its own plane, and can thus no mask deformations and consequent fading occurs. The brace 34 has two tapering ends 35 causing the rigidity of the brace 34 to decrease slowly.

The rigidity of the brace 34 at its strongest point is made no greater than the rigidity of the collars 33 of the mask 29 so that no bending of the collars 33 is caused by shocks. The rigidity of the brace 34 at the area of the aperture 36 is also reduced to ensure that the hinge points of the mask are situated at the area of the ball joints.

Figure 3:
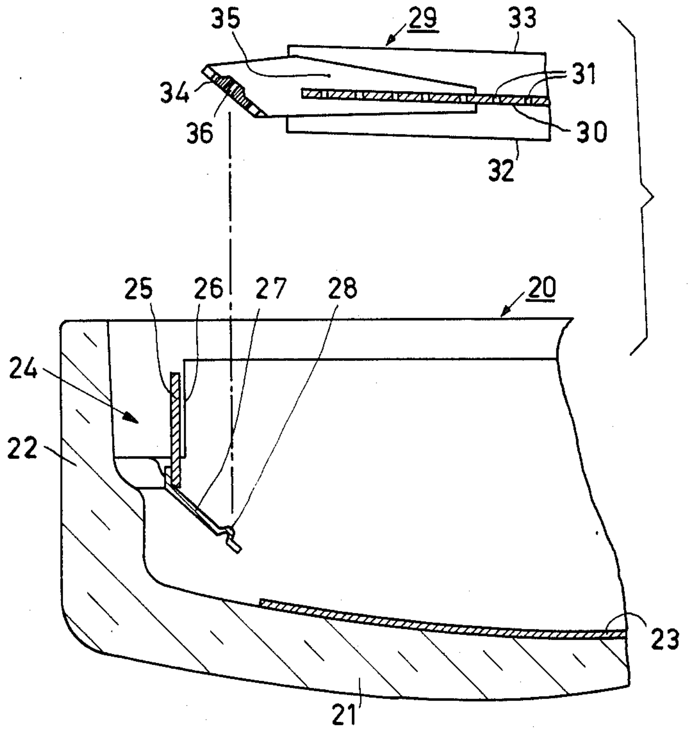
FIG. 3 is a sectional view taken on the line A'A' of FIG. 2*a*.

FIG. 3 is a sectional view taken on the line A'—A' of FIG. 2. Corresponding components are referred to by the same reference numerals as in FIG. 2. The display window 20 and the shadow mask 29 are also shown as an exploded view. The flat resilient element 27 is connected to the strip 25 at such an angle that the element 27 is substantially perpendicular to the path of the electron beam towards the corner of the display window 20. At increasing temperatures of the shadow mask a decreasing distance between the shadow mask 29 and the front portion 21 is necessary as a result of the expansion thereof to maintain a good colour purity. As a result of the resilience of the elements 27, the shadow mask 29 moves in a direction toward the front portion 21 at increasing temperature. Since the shadow mask 29 is connected in the corners of the display window 20, and is rotationally symmetrical relative to the centre of the shadow mask 29, no rotation of the shadow mask 29 occurs in the case of thermal expansion and hence no fading occurs either.

The brace 34 extends parallel to the plane of the element 27. The side of the brace 34 remote from the resilient element 27 is extruded to reinforce the aperture 36 so that the embossment 28 does not deform the aperture 36.

In the embodiment shown in FIGS. 2 and 3 the resilient element includes a spherical embossment and the brace has an aperture. Alternatively, the brace may include the spherical embossment and the resilient element may have the aperture.

Figure 4:
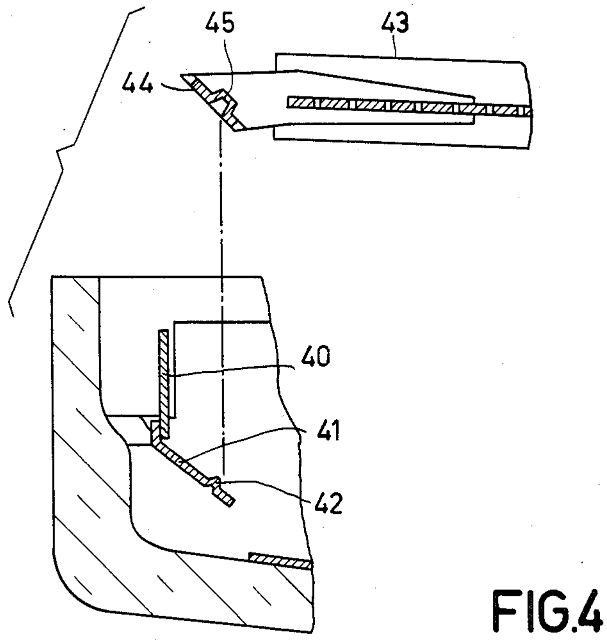
FIG. 4 is an exploded sectional view of a corner of another embodiment of the display window.

FIG. 4 is an exploded sectional view of another embodiment of a suspension in the corner of the display window which is similar to the suspension shown in FIGS. 2 and 3. The resilient element 41 connected to the strip 40 again comprises a part-spherical embossment 42. The brace 44 connected in the corner of the shadow mask 43 included as an opening in the form of a cavity formed in a sleeve-like embossment 45. The spherical embossment 42 falls partly into the sleeve-like embossment 45 in the assembled condition and is connected to the bottom thereof by means of a number of laser welds.

In the embodiments shown in FIGS. 2, 3 and 4 the strips, to which the resilient elements are connected, are fixed in the chamber-like recesses in the corners of the display window by means of a cement or a glass enamel. However, the strips may also be sealed forming the glass in the upright edge of the display window. This sealing is done, as accurately as possible, perpendicularly to the diagonals of the mask. The resilient elements are connected to the braces of the shadow mask by means of temporary clamping springs. The shadow mask is then placed at the correct distance from the display window by means of a jig which holds the four corner points of the shadow mask at the correct distance from the display window. In this position the resilient elements are connected to the strips, after which the temporary clamping springs are removed. During production of the display screen, the shadow mask can be inserted in and removed from the display window. After producing the display screen the braces are permanently connected to the resilient elements.

Figure 5:
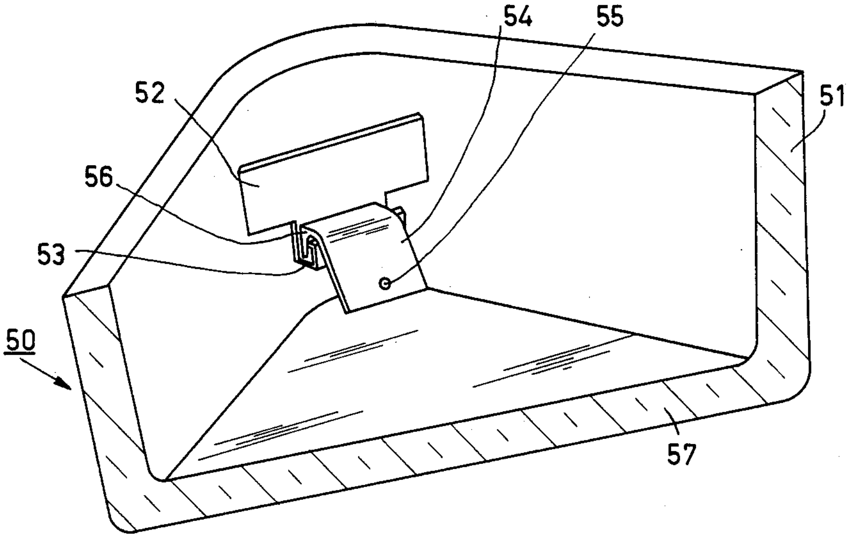
FIG. 5 is a perspective view of a corner of still another embodiment of the display window.

FIG. 5 is a perspective view of a corner of the display window 50 in which the shadow mask is not shown for reasons of clarity. A metal strip 52 is sealed in the corner of the upright edge 51. The strip 52 comprises a U-shaped bent portion 53. The resilient element 54 includes a spherical embossment 55 and a bent portion 56. After sealing the strip 52 the resilient element 54 is connected to the shadow mask by means of a temporary clamping spring. The shadow mask is then positioned at the correct distance from the front portion 57 of the display window 50, the bent portion 56 of the resilient element 54 falling in the U-shaped bent portion 53 of the strip 52. In this position the resilient element 54 is connected in the U-shaped portion 53, for example, by means of solder. In this manner, possible errors in the position of the strip 52 in all directions are removed.

What is claimed is:

1. A color display tube including an envelope having a rectangular display window, a rectangular color selection electrode having a plurality of apertures, and four suspension means for mounting corners of the rectangular color selection electrode to respective corners of the rectangular display window, each of said suspension means being sufficiently resilient to prevent deformation thereby of the color selection electrode, and comprising:

a. a first suspension element including a substantially flat portion having an opening with predefined contact points; and b. a second suspension element including a projecting portion for extending into the opening of the first suspension element and contacting the predefined contact points along the perimeter of said opening;

said first element being permanently connected to said second element at said predefined contact points by connections having sufficient elasticity to enable limited pivotal movement of said first and second elements relative to each other;

one of said first and second elements in each suspension means being affixed to a corner of the color selection electrode and the other of said elements being affixed to the respective corner of the display window.

2. A color display tube as in claim 1 where each first suspension element comprises a comparatively rigid element and where each second suspension element comprises a flat resilient element.

3. A color dispaly tube as in claim 1 or 2 where the opening in each first suspension element is triangularly-shaped and where the projecting portion of each second suspension element is rounded.

4. A color display tube as in claim 3 where the edges of each triangularly-shaped opening are formed by bent portions of the respective first suspension element, said edges extending away from the side of said first suspension element at which the respective second suspension element is connected.

5. A color display tube as in claim 1 or 2 where the opening in each first suspension element is in the form of a cavity and where the projecting portion of each respective second suspension element is connected to said predefined contact points on an inner surface defining said cavity.

6. A color display tube as in claim 1 or 2 where the predefined contact points at which the projecting portions contact the perimeters of respective openings, and the apertures in the color selection electrode all lie substantially within the same plane.

7. A color display tube as in claim 2 where each of the comparatively rigid elements is affixed to the color selection electrode and where said substantially flat portion comprises a brace which includes a part oriented for extending parallel to a part of the respective flat resilient element when connected, and which widens with increasing distance from the place of connection to the flat resilient element terminating in two tapered ends which are bent at an angle with respect to the parallel part.

8. A color display tube as in claim 2 where an end of each flat resilient element is affixed to a strip secured in the corner of an upright edge of the display window.

9. A color display tube as in claim 8 where each of said strips is secured in a chamber-like recess formed in the respective corner of the upright edge of the display window.

10. A color display tube as in claim 8 where each of said strips is sealed in the respective corner of the upright edge of the display window.

11. A color display tube as in claim 8, 9 or 10 where each strip and its respective flat resilient element include similar U-shaped portions adapted for engagement with each other.

* * * * *